United States Patent
Díaz Lankenau et al.

(10) Patent No.: US 12,418,639 B2
(45) Date of Patent: Sep. 16, 2025

(54) VIRTUAL COMPENSATION OF CAMERA POSITIONS IN A LIGHT FIELD DISPLAY

(71) Applicant: Google LLC, Mountain View, CA (US)

(72) Inventors: Guillermo Fabian Díaz Lankenau, Santa Cruz, CA (US); Antonio Yamil Layon Halun, Mountain View, CA (US)

(73) Assignee: Google LLC, Mountain View, CA (US)

( * ) Notice: Subject to any disclaimer, the term of this patent is extended or adjusted under 35 U.S.C. 154(b) by 258 days.

(21) Appl. No.: 18/297,521

(22) Filed: Apr. 7, 2023

(65) Prior Publication Data
US 2024/0340399 A1    Oct. 10, 2024

(51) Int. Cl.
*H04N 13/254* (2018.01)
*G01B 11/16* (2006.01)
*H04N 13/243* (2018.01)
*H04N 13/246* (2018.01)

(52) U.S. Cl.
CPC .......... *H04N 13/254* (2018.05); *G01B 11/16* (2013.01); *H04N 13/243* (2018.05); *H04N 13/246* (2018.05)

(58) Field of Classification Search
None
See application file for complete search history.

(56) References Cited

U.S. PATENT DOCUMENTS

| | | | |
|---|---|---|---|
| 6,219,011 B1* | 4/2001 | Aloni | H04N 9/3147 345/1.3 |
| 2005/0117034 A1* | 6/2005 | Cutler | H04N 1/6027 348/239 |
| 2020/0242792 A1 | 7/2020 | Liu et al. | |
| 2021/0021748 A1* | 1/2021 | Cutler | H04N 5/33 |
| 2021/0195167 A1 | 6/2021 | Zabatani et al. | |

FOREIGN PATENT DOCUMENTS

WO    2021011100 A1    1/2021

OTHER PUBLICATIONS

Adamczyk, et al., "Temperature Compensation Method for Mechanical Base of 3D-Structured Light Scanners", Sensors 2020, 20(2), 362, https://doi.org/10.3390/s20020362, www.mcpi.com/journal/sensors, 19 pages.

(Continued)

*Primary Examiner* — Christopher Braniff
(74) *Attorney, Agent, or Firm* — Brake Hughes Bellermann LLP

(57) ABSTRACT

Systems and methods are disclosed in which low-cost sensors are mounted onto a 3D light field display to measure variations in strain or temperature. The sensors can be mounted to a common backplate with the cameras to correlate camera motion in response to thermally-induced deformation of the display. Once a correlation between the sensor measurements and camera motion is pre-established, for example, by using machine learning, the resulting system model can be used so that real time measurements of the display can instantly predict changes in camera positions at any given time. Updated camera positions can then be used when combining images to produce a stereoscopic effect.

12 Claims, 12 Drawing Sheets

(56) References Cited

OTHER PUBLICATIONS

Fan, et al., "Unimorph deformable mirror with an integrated strain feedback layer", Applied Optics, vol. 57, Issue 21, https://doi.org/10.1364/AO.57.006102, 2018, pp. 6102-6109.

Price, et al., "Self-Aware Telescope: FY19 Optical Systems Technology Line-Supported Program", Massachusetts Institute of Technology, Lincoln Laboratory, Project Report LSP-277, Dec. 17, 2019, 45 pages.

International Search Report and Written Opinion for PCT Application No. PCT/US2024/023310, mailed on Jul. 9, 2024, 19 pages.

* cited by examiner

VIRTUAL COMPENSATION OF CAMERA POSITIONS IN A LIGHT FIELD DISPLAY

FIELD OF THE DISCLOSURE

The present disclosure relates to a system for 3D video communication with improved image quality.

BACKGROUND

Video communication systems, e.g., systems used for video conferencing or video chats, facilitate collaboration in real space. However, some aspects of non-verbal communication, such as subtle facial expressions or body language can still be lost, which can compromise the quality of the interaction. Augmented reality (AR) or virtual reality (VR) systems can deliver a more comprehensive user experience, but they require users to wear headsets that transition the user from their natural environment into an immersive virtual space.

An enhanced video communication system is possible in which a user's image is presented as a 3D model, without a need to wear an AR/VR headset. In the enhanced video communication system, for example, each user sits in a booth facing a light field display that includes a projection system and an array of cameras, sensors, and lights directed at different angles. The light field display projects a 3D, hologram-like, life-size image of the user, for viewing by other, remote users. With such an arrangement, the video communication experience feels more realistic because the 3D imaging provides live volumetric capture that transmits body language and subtle facial expressions, not just a flat image of a "talking head." Consequently, remote users can feel as though they are in the same room together.

SUMMARY

The present disclosure describes methods and systems for improving image quality in a 3D video communication system, by compensating for the effects of thermally induced strain in a light field display.

In some aspects, the techniques described herein relate to a method, including: performing a first measurement of a disturbance in an optical display using a sensor attached to the optical display; performing a second measurement of camera motion in response to the disturbance; establishing a correlation between the first measurement and the second measurement; measuring a real-time disturbance in the optical display; estimating changes in relative camera positions due to the disturbance; combining image data from multiple cameras using the estimated changes; and outputting a corrected combined image to the optical display.

In some aspects, the techniques described herein relate to a system, including: an optical display; a sensor attached to a first side of the optical display; a camera attached to a second side of the optical display opposite the sensor; and a processor coupled to the sensor and the camera, the processor configured to: correlate measurements of the sensor with motion of the camera; estimate changes in relative camera positions; combine image data using the estimated changes; and output a corrected combined image to the optical display.

In some aspects, the techniques described herein relate to a method of virtual compensation in a 3D camera system, the method including: performing a measurement of an optical display using a sensor coupled to the optical display; generating an estimated camera position based on the measurement and an established relationship between sensor measurements and camera motion; using the estimated camera position to combine image data; and outputting the combined image data to the optical display.

In some aspects, the techniques described herein relate to a method, including: establishing a relationship between sensor measurements and camera motion in a three dimensional (3D) light field display; and compensating camera positions during a 3D live video stream, based on real-time sensor measurements and the relationship.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

Figure 1:
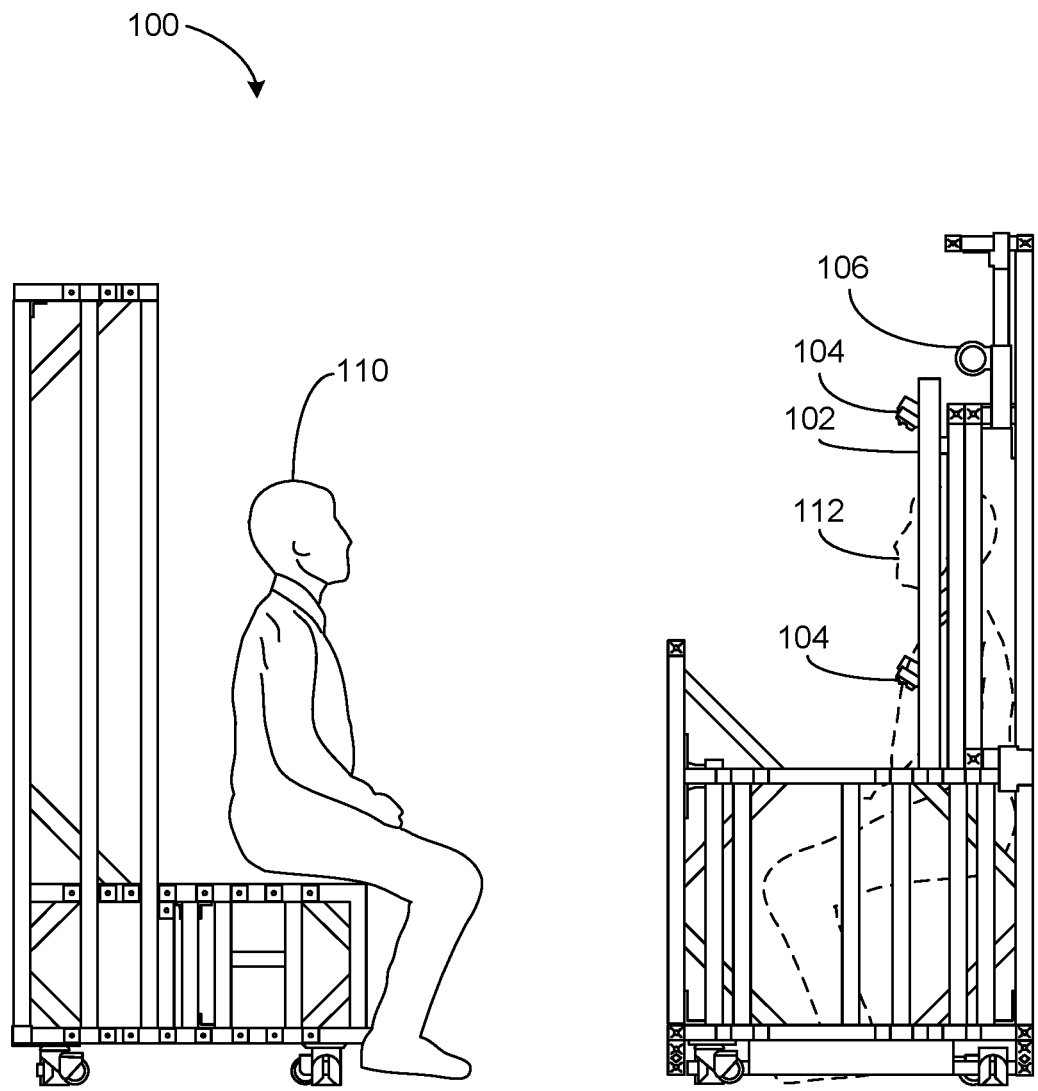
FIG. 1 is a pictorial view of a 3D video communication system according to a possible implementation of the present disclosure.

DETAILED DESCRIPTION 3D lightfield displays can produce an autostereoscopic effect that enables an observer to perceive image depth (3D)

without wearing special headgear. A stereoscopic effect can be created by a projection system that positions copies of an image in front of a user's left eye and right eye that are shifted horizontally relative to each other. An example 3D lightfield display uses lenticular optics to provide the autostereoscopic effect. The lenticular optics may be implemented as a series of vertically-oriented cylindrical camera lenses formed on a sheet, e.g., a lenticular film, that is fitted onto a display screen, to form an integrated 3D camera system. In some implementations, the lenses are formed as a 2D matrix covering the area of the display screen. In some implementations, the lenses are formed around an outer bezel of the display screen. In either arrangement, presenting and/or recording 3D video content requires the camera optics to be located with high precision relative to one another for the entirety of the video session.

One technical problem with such 3D light field displays that combine multiple video feeds into a composite 3D image is that the video quality is diminished if the position of any one of the cameras varies. Slight changes in camera position can result from geometric distortion of the lenticular film, resulting in flickering or jumping, or blurred features in the composite image. Such a geometric distortion can be thermally induced. That is, localized heating of the display can occur due to the operation of light emitting diodes (LEDs) and/or other electronic components, or even by sunlight incident on the display. Consequently, existing commercial displays, used as computer monitors or televisions, lack the geometric stability needed to sustain performance of the lenticular film, for high quality 3D video communication. However, camera motion due to heating can be predictable if such localized temperature variations are known.

The disclosed systems and methods address the technical problem of camera motion by mounting sensors, for example low-cost sensors, onto the display to measure variations in strain or temperature, associated with such camera motion. For example, a strain gauge can be mounted to a back side of the display to measure strain on the display. Then, an estimate of camera motion caused by the strain can be calculated. Additionally, or alternatively, temperature sensors can be used to detect localized heating, and to predict camera motion resulting from such heating. Once the camera motion is predicted, compensation can be made to prevent deterioration of the image quality.

Rather than correlating strain or temperature measurements with camera motion in real time, a correlation between the measurements and camera motion can be pre-established. This correlation is pre-established using machine learning and system identification techniques, in which strain and temperature measurements, for example, are inputs to a system model, and in response, the system model outputs measured camera motions. Once a correlation is set up, real time measurements of the display, e.g., real time temperature and/or strain measurements, can be used to instantly predict and compensate for camera motion at any given time.

FIG. 1 shows a 3D video communication system 100 according to a possible implementation of the present disclosure. The 3D video communication system 100 includes a display 102, e.g., an optical display, onto which a plurality of display cameras 104 (two shown) are mounted in a precise arrangement. In some implementations, lenses of the display cameras 104 can be formed on a lenticular film attached to the display 102. Additionally, or alternatively, a frame camera 106 and/or light can be mounted on a separate frame above, below, or adjacent to the display 102. A local user 110 can be seated opposite the display 102, to observe a 3D image 112 of a remote user. The local user 110 can be seated a few feet from the display 102, at a distance that would normally separate two people meeting together in the same room. The multiple display cameras 104 and the frame camera(s) 106 are focused simultaneously on the local user 110 to provide the remote user with a similar 3D image of the local user 110.

Figure 2A:
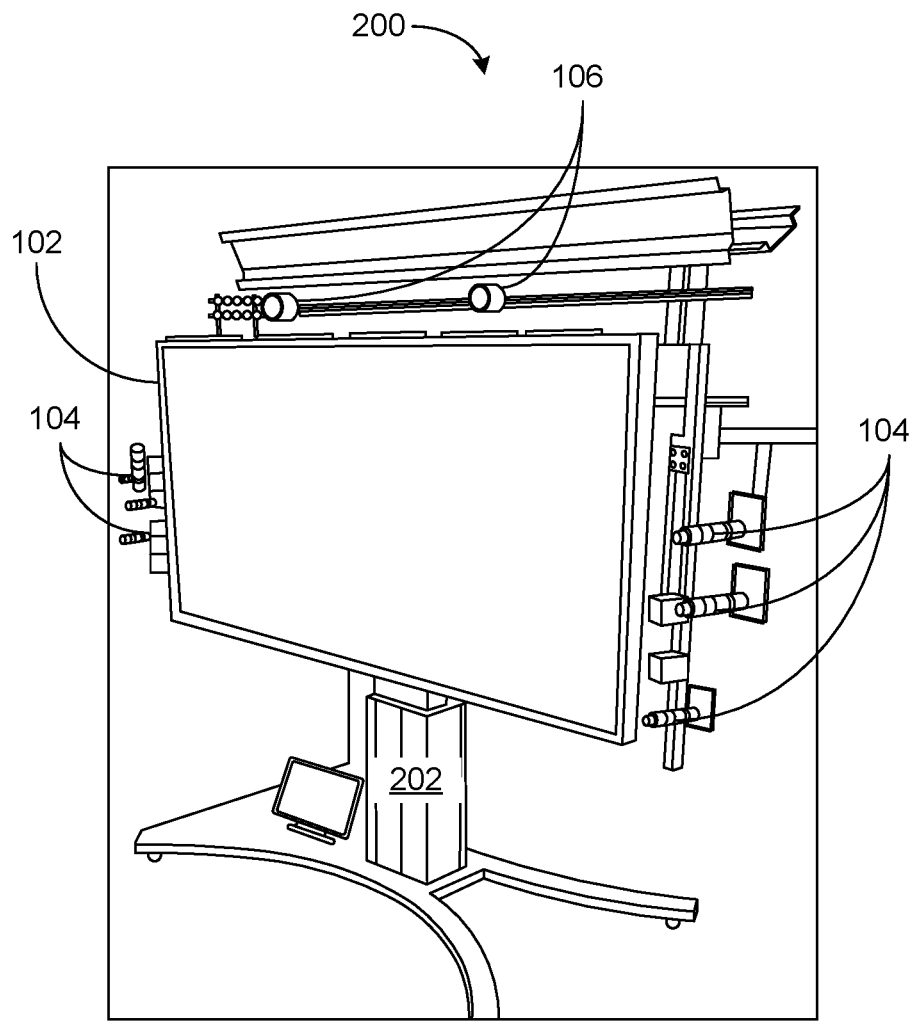
FIG. 2A is a perspective view of a front side of a 3D light field display according to a possible implementation of the present disclosure.

FIG. 2A shows a front view 200 of a prototype of the display 102, according to a possible implementation of the present disclosure. In FIG. 2A, display cameras 104 (5 shown) are arranged around a perimeter, e.g., on a bezel, of the display 102. The display 102 can be supported by a frame 202. In some implementations, frame cameras 106 (2 shown) can be mounted to the frame 202, above, below, or to the sides of the display 102.

One of the challenges of the 3D video communication system 100 is to maintain accurate camera positions to successfully combine the video feeds from the various cameras. If the camera positions vary with respect to one another, the video image quality is diminished as the overlay of the video images becomes mis-aligned. While the display cameras 104 are subject to variations in their positions, even if the frame cameras 106 remain stationary, the relative positions of the various cameras may still vary.

In some implementations, a choice of materials used in the display 102 or in the frame 202 can minimize thermal distortions, for example, by substituting carbon fiber for aluminum. However, such materials may be cost-prohibitive. In some implementations, reducing ambient temperature variation from heat sources or exposure to sunlight can reduce thermal distortion. However, such environmental solutions would limit where the 3D video communication system 100 can be installed and are therefore impractical. Instead of attempting to prevent thermal distortion, a feasible approach is to compensate for thermally-induced camera motion by employing a combination of low-cost sensors and software.

Figure 2B:
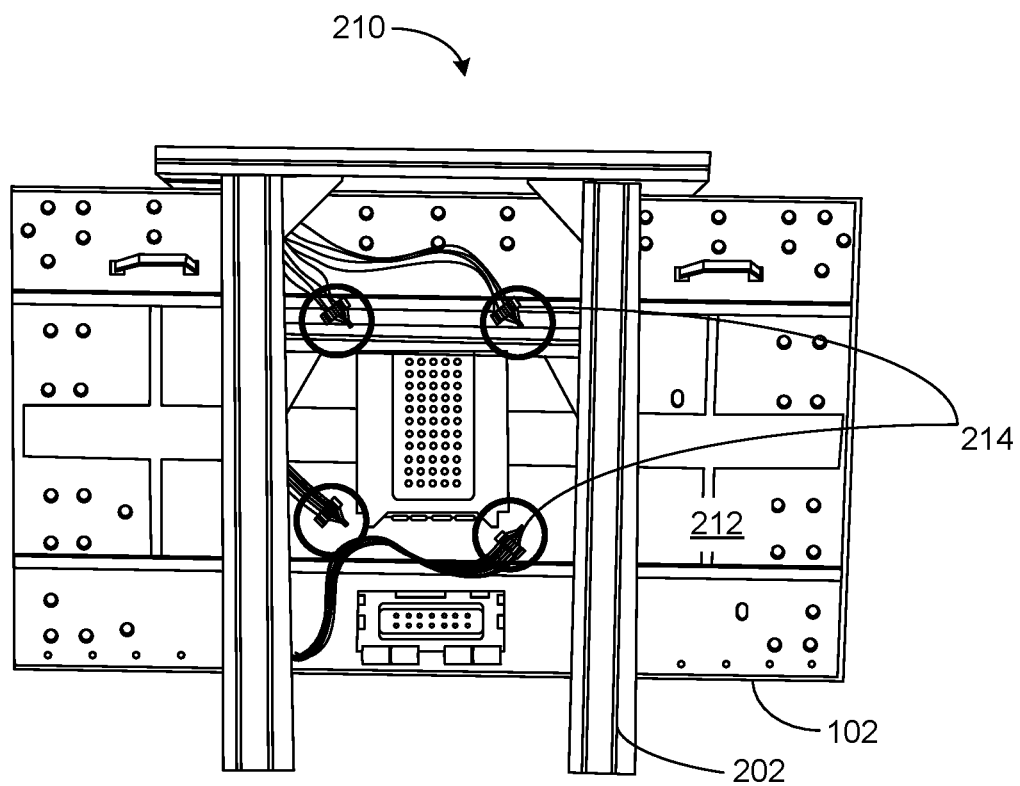
FIG. 2B is a plan view of a rear side of a 3D light field display according to a possible implementation of the present disclosure.

FIG. 2B shows a rear view 210 of the prototype of the display 102 supported by the frame 202, according to a possible implementation of the present disclosure. The display 102 includes a backplate 212, to which sensors 214, e.g., strain gauges (4 shown) can be attached to monitor stress that can alter positions of the display cameras 104 attached to the central area of the display 102 or to the perimeter of the display 102. In some implementations, the backplate serves as a heat sink as well as structural support for the display 102. In some implementations, the backplate 212 is made of structural steel to minimize bending in response to temperature cycling, wherein surfaces of the steel backplate 212 may radiate heat with an emissivity of about 0.3. The sensors 214 can be attached to the backplate 212 such that they are invisible to the local user 110.

Figure 3:
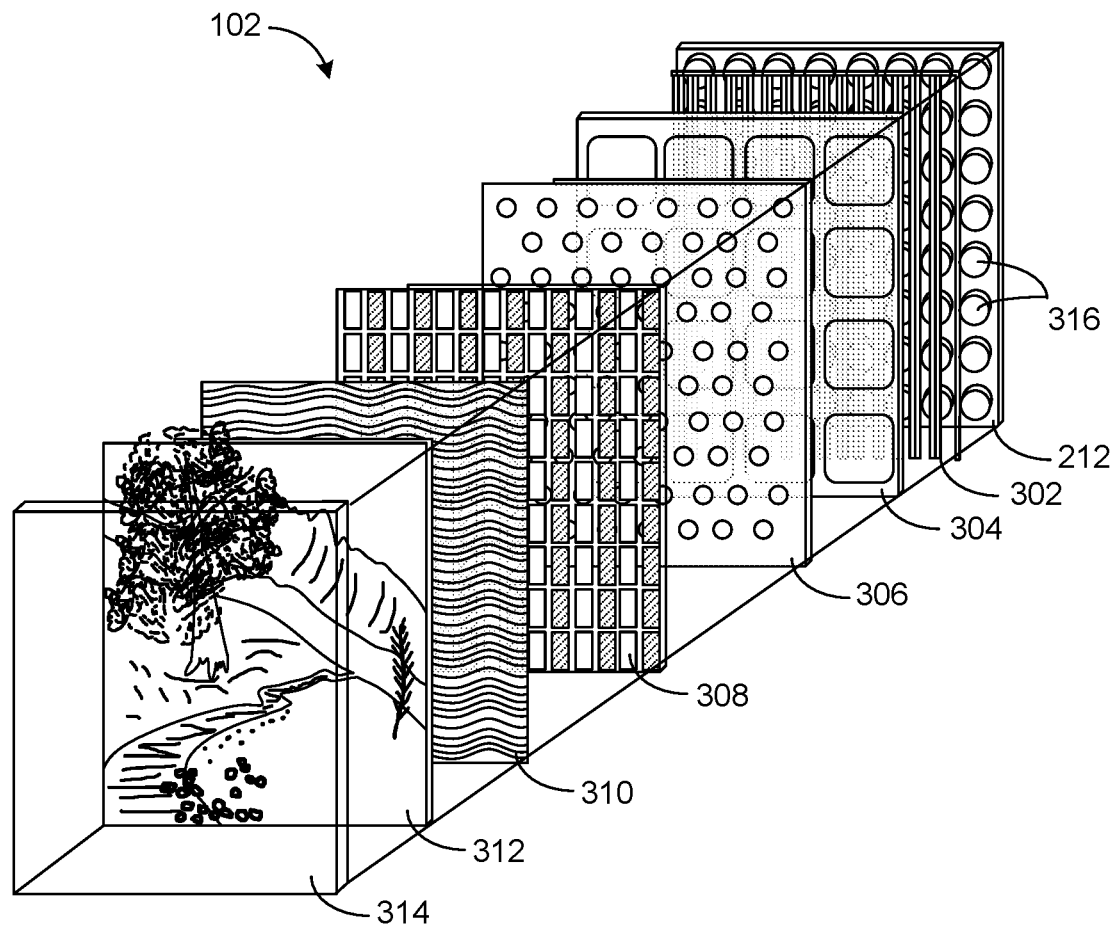
FIG. 3 is an exploded view of different layers of an optical display, according to a possible implementation of the present disclosure.

FIG. 3 is an exploded view showing various layers of a light field display, e.g., the display 102, according to a possible implementation of the present disclosure. The display 102 can include, for example, the backplate 212, a first polarizing layer 302, a thin film transistor (TFT) layer 304, a liquid crystal display (LCD) layer 306, a color filter layer 308, a second polarizing layer 310, a picture layer 312, and a cover 314. The backplate 212 includes LEDs 316 as light sources for the display 102. The LEDs can be arranged as a matrix array that occupies a large portion of the area of the display 102 so as to form a light field display. The first polarizing layer 302 can be placed adjacent to the LEDs 316. The first polarizing layer 302 can be, for example, a glass filter having a polarizing film deposited thereon. The TFT layer 304 can be placed adjacent to the LCD layer 306. The color filter layer 308 can be inserted on top of the LCD layer 306. The second polarizing layer 310 can be inserted next to the color filter layer 308. The picture layer 312 is where the projected image is formed. The cover 314 can be a glass layer that protects the picture layer 312.

Figure 4B:
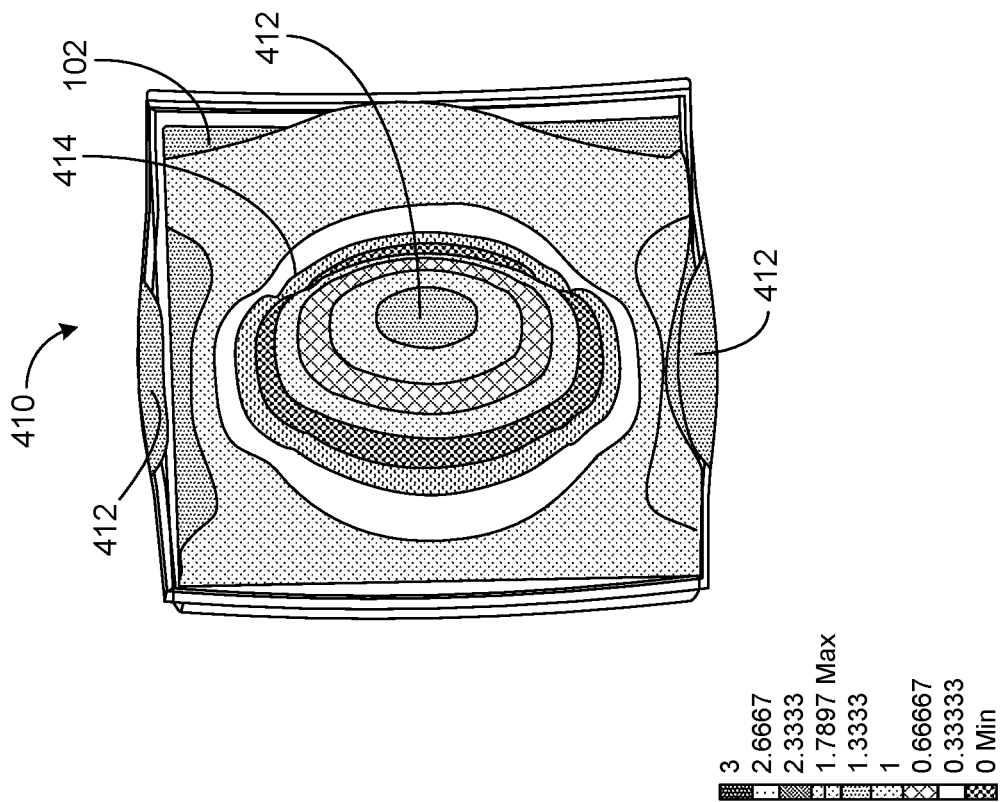
FIG. 4B is a simulated deformation map of a backplate of an optical display, according to a possible implementation of the present disclosure.
Figure 4A:
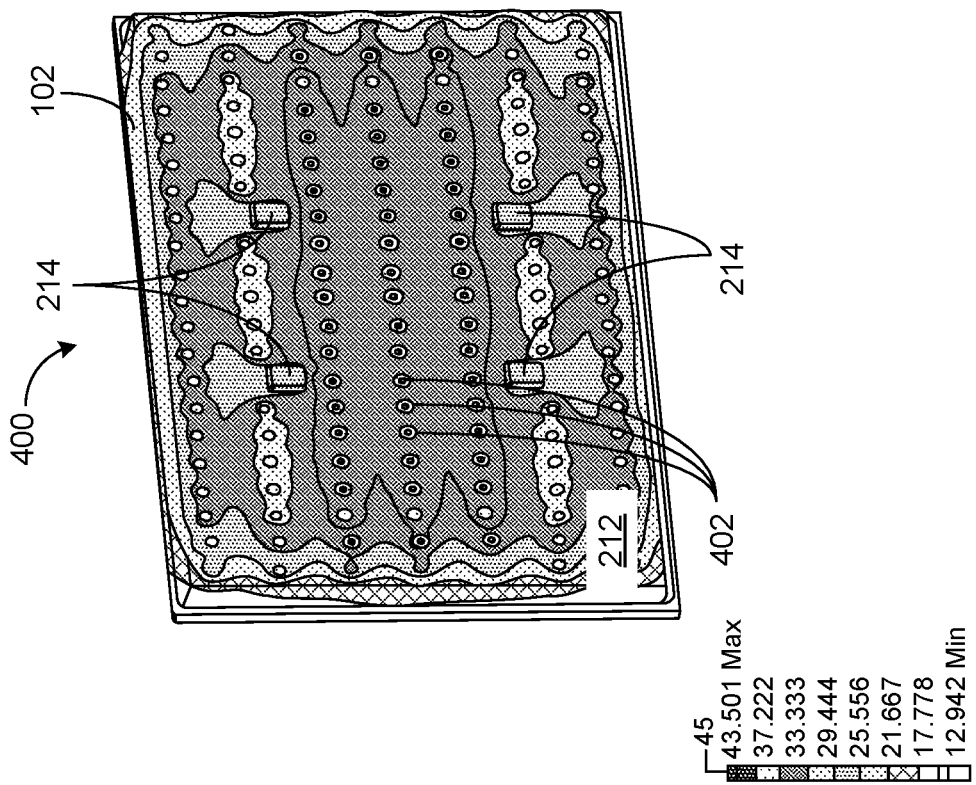
FIG. 4A is a simulated thermal map of a backplate of an optical display, according to a possible implementation of the present disclosure.

FIG. 4A is a thermal map 400 of a front side of the backplate 212, according to a possible implementation of the present disclosure. The thermal map 400 shows a steady state temperature profile of the backplate 212, in accordance with simulation results. The sensors 214 are also indicated on the thermal map 400. Sensors 214 can be, for example, temperature sensors, e.g., thermocouples, optical sensors, strain gauges, or other types of low cost sensors that monitor conditions associated with localized geometric distortions of the backplate 212. The thermal map 400 indicates point hot spots 402 corresponding to internal electronic components within the display 102, adjacent to the backplate 212. In some implementations, the point hot spots 402 can correspond to locations of the LEDs 316 within the display 102, of which there may be, for example, 200 to 400 LEDs per display, arranged in rows. In some implementations, the point hot spots 402 are hotter near the center of the display 102 than at the edges. In some implementations, an average temperature change $\Delta T$, associated with hot spots 402 can be about 28.5 degrees C., as predicted by a simulation used to generate the thermal map 400.

FIG. 4B is a deformation map 410 of a front side of the backplate 212, according to a possible implementation of the present disclosure. The deformation map 410 shows a static structural profile of the display 102, in accordance with simulation results. The deformation map 410 indicates distortions 412 (three shown), at the center of the display 102, and at central portions of the top and bottom edges of the display 102. The distortion 412 located at the center of the display 102 coincides with the most extreme point hot spots 402. In some implementations, a deformation-free region 414, e.g., a circular region, may exist. If sensors are placed at locations coinciding with the deformation-free region 414, instead of at the center of the display 102 or at the edges of the display 102, the effects of thermally-induced distortion may not be detected.

Figure 5:
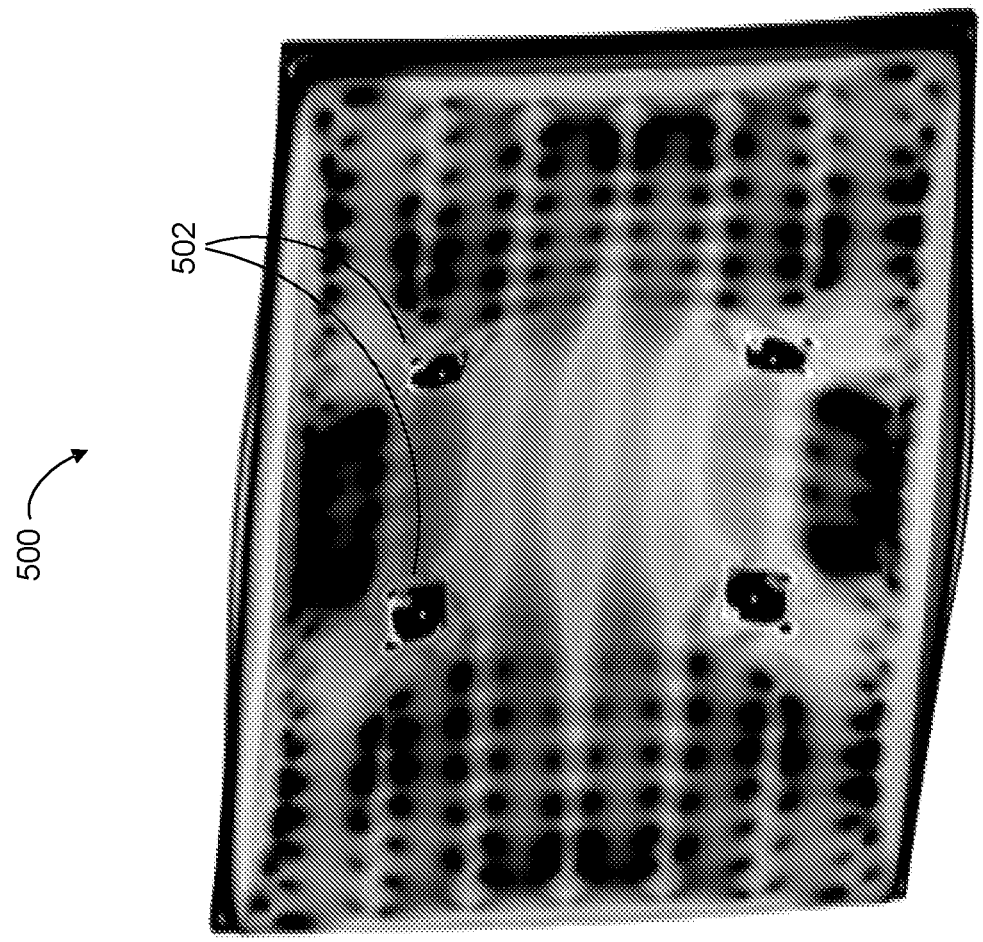
FIG. 5 is a simulated strain map of a backplate of an optical display, according to a possible implementation of the present disclosure.

FIG. 5 shows a strain map 500 derived from a finite element analysis (FEA) of a rear side of the backplate 212, according to a possible implementation of the present disclosure. The strain map 500 shows that the highest strain corresponds to bolt positions 502 (4 shown). Placing strain sensors 214 at the bolt positions 502 on the back side of the backplate 212 therefore would ensure that changes in strain are captured by the sensors 214. Accordingly, the bolt positions 502 correspond to locations of the sensors 214 as shown in FIG. 2B.

Figure 6:
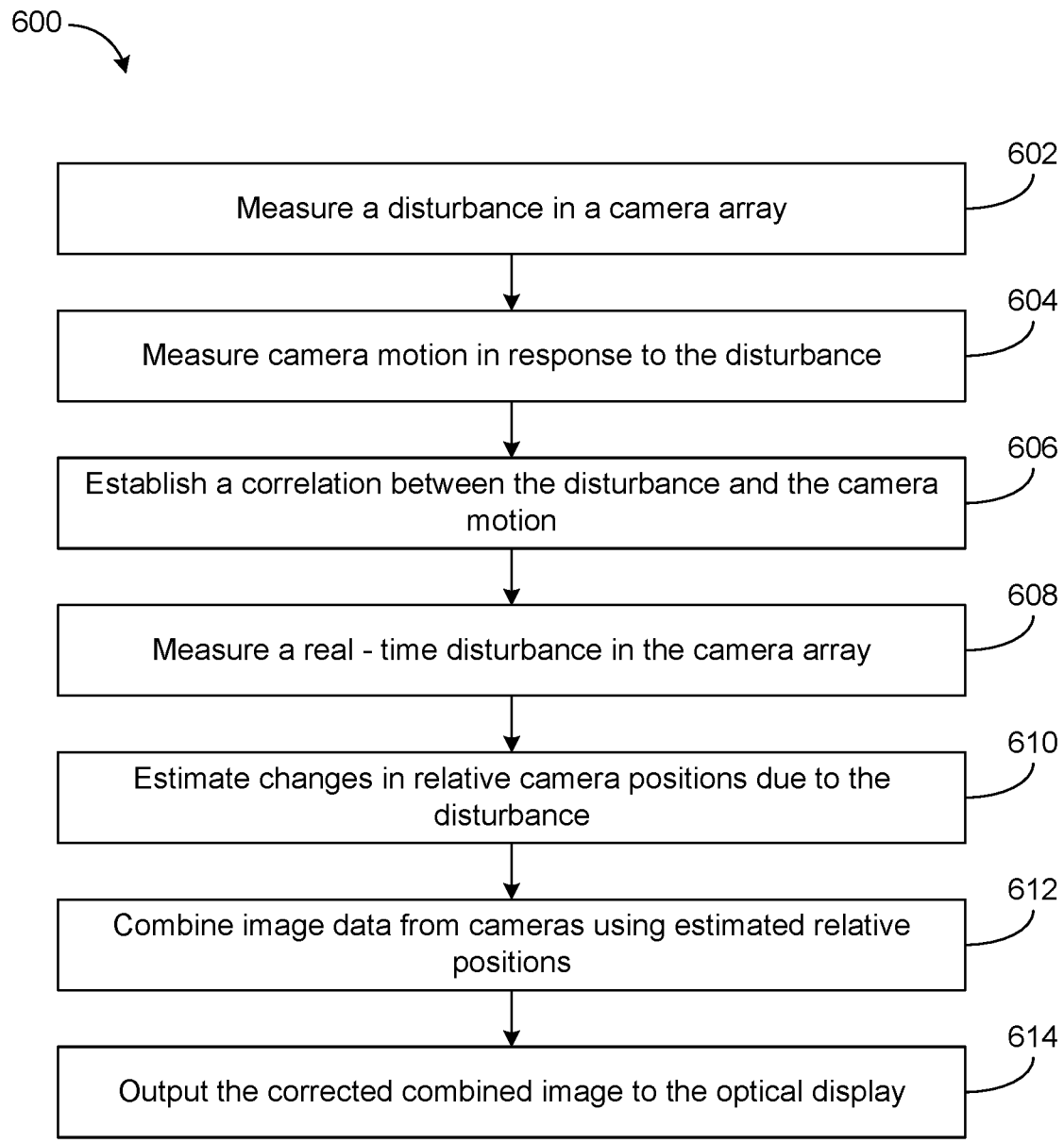
FIG. 6 is a flow chart for a method of improving image quality of a 3D light field display, according to a possible implementation of the present disclosure.

FIG. 6 illustrates a method 600 for a compensation process, according to a possible implementation of the present disclosure. Operations of the method 600 can be performed in a different order, or not performed, depending on specific applications. The method 600 may be performed using the low-cost sensors 214 shown in FIGS. 2B and 4A. The method 600 includes preliminary operations that occur prior to a video session as well as real-time operations that occur during a video session. It is noted that the method 600 may not completely compensate for thermal distortions affecting a display 102. Accordingly, it is understood that additional processes can be provided before, during, or after the method 600, and that some of these additional processes may be briefly described herein.

The method 600 includes, at 602, measuring a disturbance in an optical display, e.g., the display 102, using the sensors 214. In some implementations, measuring the disturbance can include recording temperature values from sensors 214 implemented as temperature sensors, e.g., thermocouples. In some implementations, measuring the disturbance can include recording light intensity values from sensors 214 implemented as optical sensors. In some implementations, measuring the disturbance can include recording distortion values from sensors 214 implemented as structural distortion sensors, e.g., strain gauges. When the sensors 214 are placed judiciously at locations of high sensitivity on the backplate 212, the sensor measurements can be used to predict camera positions with a high degree of accuracy. The thermal map of FIG. 4A, the deformation map of FIG. 4B, and the strain map of FIG. 5 can be used as guides for placing the sensors 214. In some implementations, sensor measurements can be repeated at different locations on the backplate 212 to build a database of sensor as a function of sensor position and time. Since the disturbances in the display 102 are thermally driven, timestamps of the sensor measurements can be relative to an initial time when the 3D video communication system 100 is powered on.

Figure 7A:
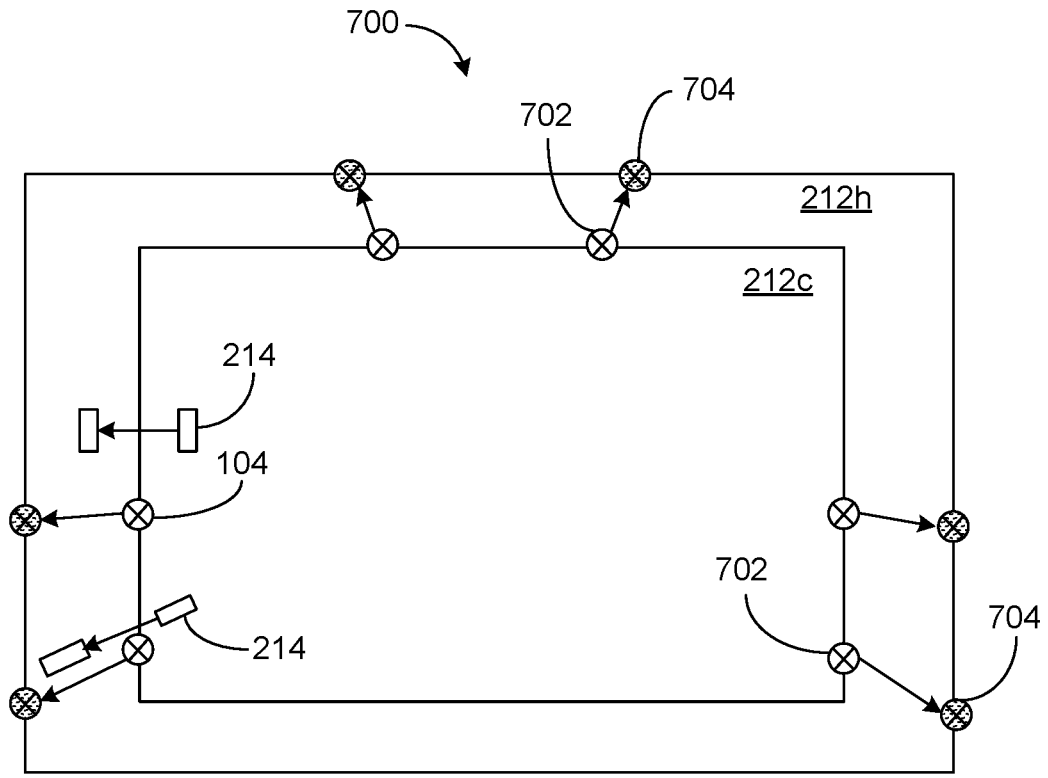
FIGS. 7A and 7B illustrate components of a 3D video communication system according to a possible implementation of the present disclosure.
Figure 7B:
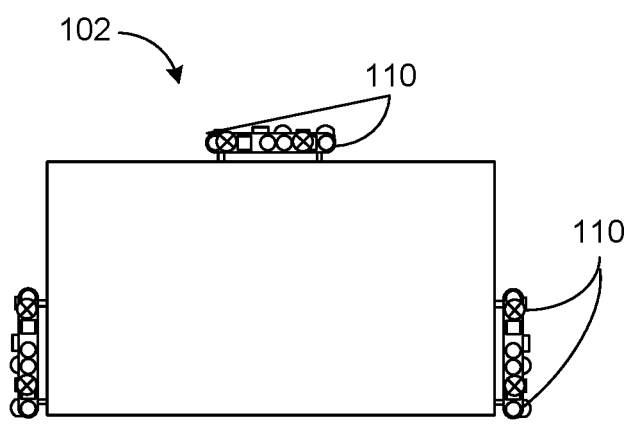

The method 600 further includes, at 604, measuring camera motion in response to the disturbance, and recording changes in the camera positions associated with the disturbance, as illustrated in FIGS. 7A and 7B according to a possible implementation of the present disclosure.

Referring to FIG. 7A, an exaggerated rear view 700 of the backplate 212 is shown. before and after a heating event. In response to heating, dimensions of the backplate 212 expand from a cold backplate 212c having small dimensions to a hot backplate 212h having larger dimensions than those of the cold backplate 212c. Sensors 214, e.g., a thermocouple and a strain gauge are shown near an outer edge of the cold backplate 212c, and again near an outer edge of the hot backplate 212h. Meanwhile, an initial position 702 of a display camera 104 (six shown) located on a bezel of the cold backplate 212c moves outward to a final location 704 on a bezel of the hot backplate 212h as the backplate temperature rises and the backplate 212 expands. Meanwhile, as shown in FIG. 7B, positions of frame cameras 110 that are mounted adjacent to, rather than on, a front side of the display 102 remain stationary. In some implementations, camera position measurements can be repeated at different locations on the backplate 212 to build a database of camera motion as a function of time. Camera positions can be determined relative to neighboring cameras, in an array of display cameras 104 attached to the display 102.

Figure 8:
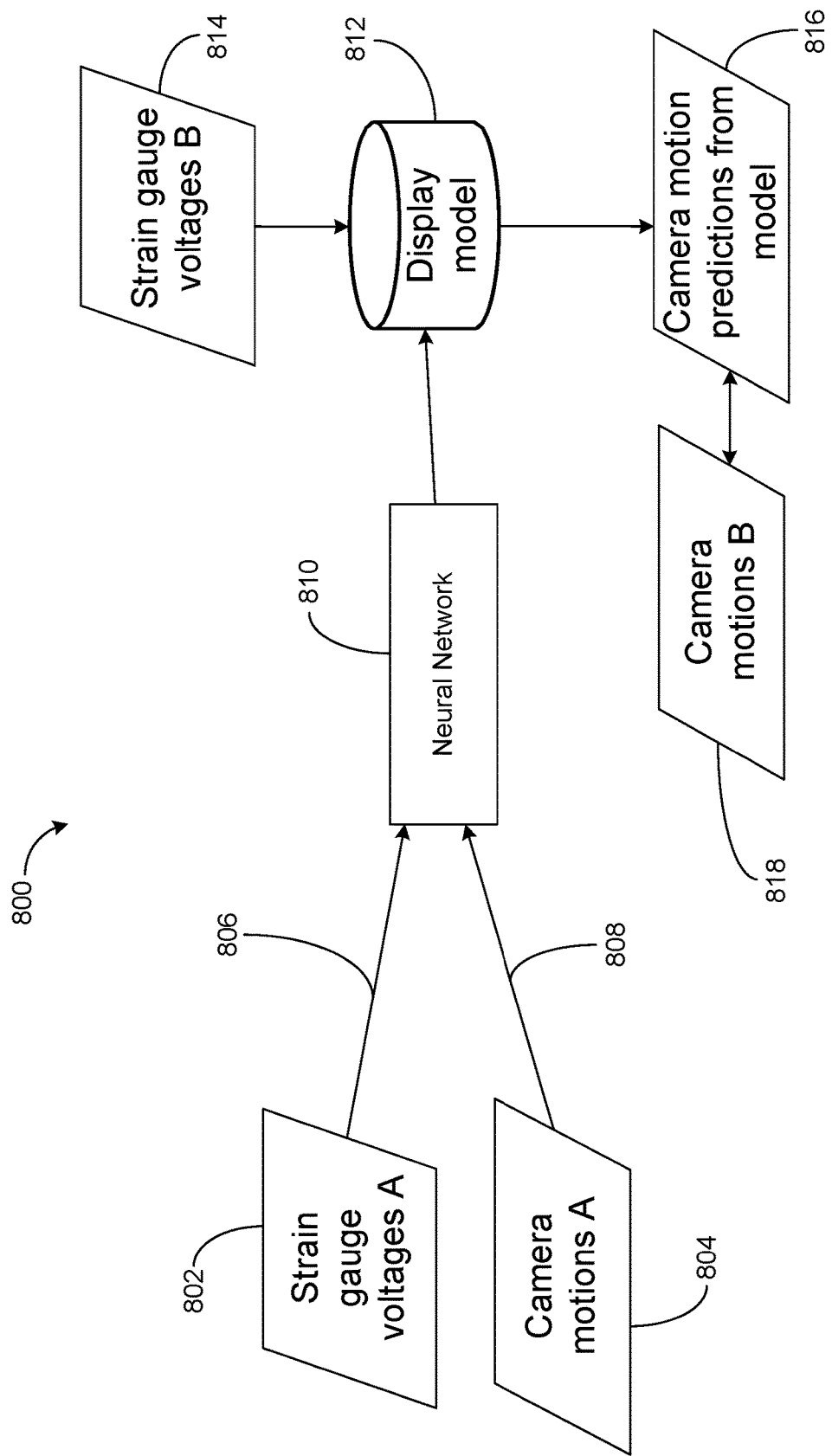
FIG. 8 is a block diagram showing data flow for virtual compensation of a 3D video communication system, according to a possible implementation of the present disclosure.

The method 600 further includes, at 606, correlating disturbances to camera motion, as illustrated in FIG. 8, according to a possible implementation of the present disclosure. FIG. 8 shows a block diagram illustrating data flow 800 during a correlation process. In a first experiment ("A") initial measurements are taken, for example, strain gauge voltages 802 can be measured concurrently with camera motions 804 for typical use cases. In some implementations, recording camera positions to determine camera motion can require a large space and specialized equipment. Therefore, data collected during the first experiment A can be recorded during production testing of the 3D video communication system 100, prior to delivering the 3D video communication system 100 to a customer. Data elements relating camera positions to sensor measurements taken at similar positions and times can be recorded, e.g., stored in a database. The correlation can be repeated for different types of sensors 214.

By correlating the recorded camera positions to the sensor measurements of the disturbance, camera motion can be predicted from future sets of sensor values measured during real-time operation of the 3D video communication system 100. In some implementations, a relationship between the disturbance represented by, for example, the strain gauge voltages and the recorded camera positions can be expressed as a function that can be used to compute future camera positions from sensor measurements. For example, the function can be a transfer function that characterizes an impulse response of the system. Identification of such a function is known as a system identification technique. In some implementations, a look-up table can be created that relates the sensor measurements to the recorded camera positions. In some implementations, the data from experiment A can be used as training data labels 808 and training data inputs 806 to a machine learning algorithm for establishing a neural network 810. In some implementations, storing the data elements in the database includes relating the data elements using the neural network 810. Through machine learning, the neural network 810 can form a model 812 of the display 102, such that a future set of measured strain gauge voltages 814 (experiment "B") can be input to the model 812, and the model 812 can automatically produce a camera motion prediction 816 during real-time operation of the 3D video communication system 100. The camera motion prediction 816 can be applied as a correction factor to update measurements of camera positions. In this way, the sensor measurements can be translated into real-time camera pose estimates.

Figure 9A:
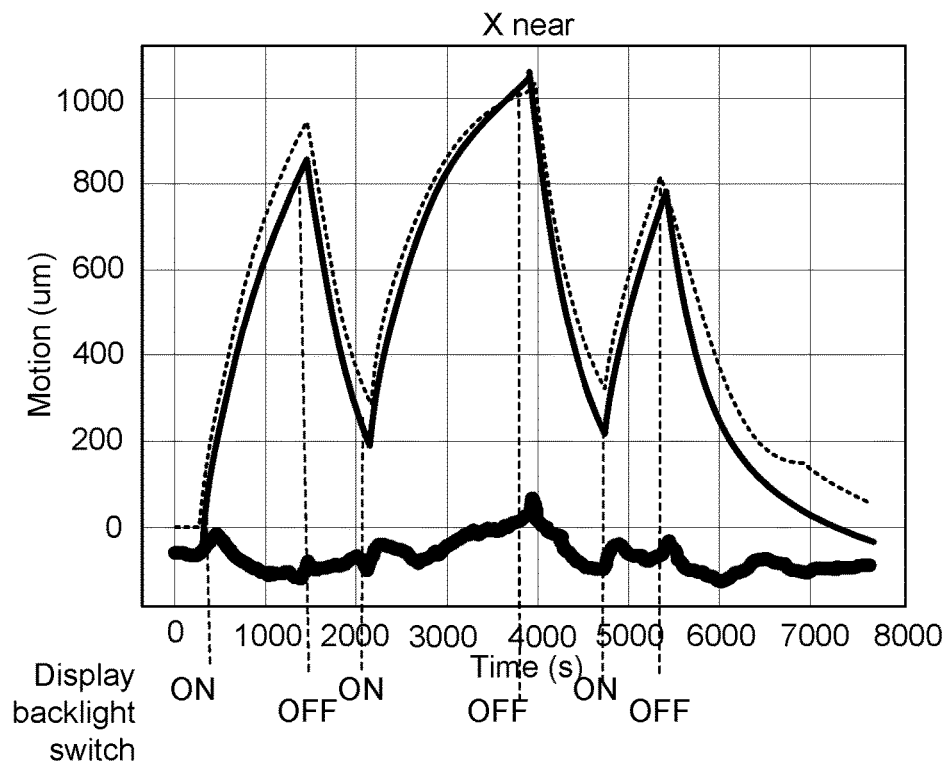
FIGS. 9A and 9B illustrate a comparison between measured data and model predictions in a 3D video communication system, according to a possible implementation of the present disclosure.
Figure 9B:
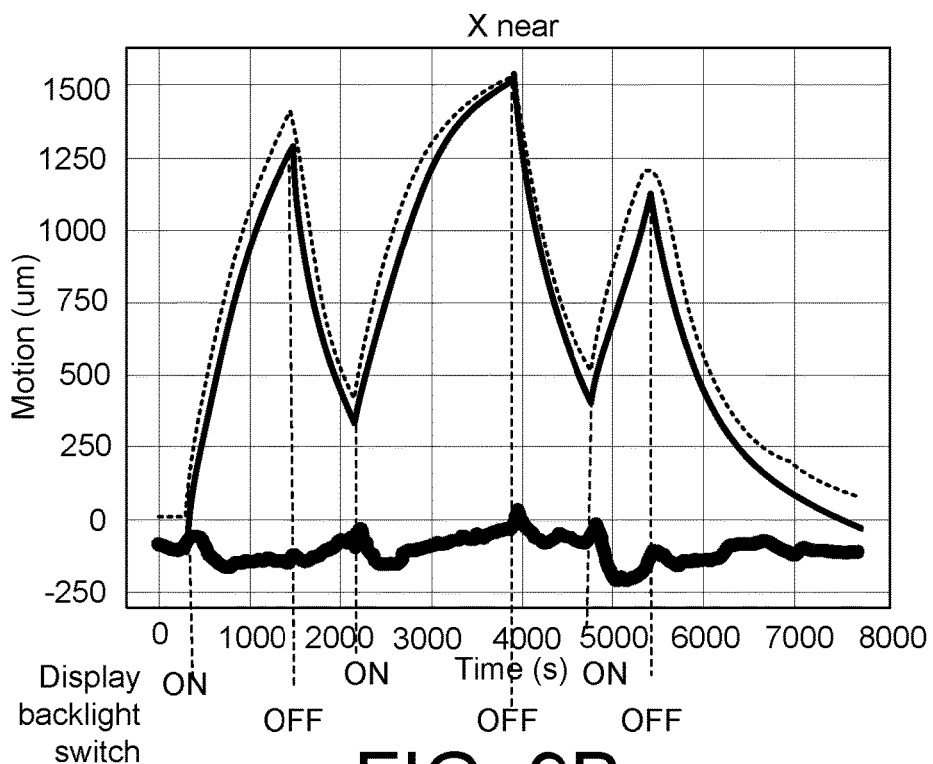

Periodically, actual camera motion measurements 818 can be collected in experiment B to calibrate the model 812, as illustrated in FIGS. 9A and 9B, according to a possible implementation of the present disclosure. That is, the camera motion predictions 816 can be compared with the actual camera motion measurements 818 to check the accuracy of the model 812. In some implementations, actual camera motion measurements 818 for use in calibrating the model 812 can be obtained using a laser-based metrology set-up. In some implementations, images from the cameras themselves can be used to infer camera motion.

FIGS. 9A and 9B show measured camera positions (dotted lines) superimposed on camera positions predicted by the model 812 (solid lines), and the difference A between the two data sets. The camera positions represented in the plots are lateral offset positions, in units of microns (μm) of the center of the camera aperture, relative to an axis normal to the display 102, as a function of time in seconds. FIG. 9A shows camera motion perceived from a distance of about 1 m in front of a display 102 in which cameras are mounted across the area of the display 102; FIG. 9B shows camera motion perceived from a distance of about 1.5 m in front of the display 102, in which cameras are mounted along a bezel, around a perimeter of the display 102.

Oscillations in the plots indicate how display distortion is affected by a user activating and deactivating electronics on the display 102 by turning the display on and off throughout a day. When the display 102 is activated, waste heat is produced by the internal electronics, for example, by high powered LEDs that provide backlighting for the display. The waste heat causes distortion to increase relative to a geometry of the display in its deactivated state. The display 102 warms up until it reaches a steady state above room temperature. When the display 102 is turned off, it cools down to room temperature. FIG. 9B corresponds to a case in which the display 102 was alternatively activated and deactivated every 15 to 45 minutes.

The method 600 further includes, at 608, determining a correction factor for a digital image to be displayed on the display 102, according to a possible implementation of the present disclosure. While the 3D video communication system 100 is in use, sensor data can be recorded and input to the model 812. The output of the model 812, that is, the camera motion predictions 816, can then be used to update the relative position and/or orientation of each display camera 104 as they respond in real time to expansion and contraction of the display 102. Thus, the software can be continuously updated with the predicted locations of the display cameras 104. In some implementations, applying the method 600 can reduce uncertainty in the camera positions by a factor of 5-10 times.

The method 600 further includes, at 610, correcting a composite digital image, according to a possible implementation of the present disclosure. The digital image to be displayed on the display 102 is a composite, that is, a combined image that includes image data from multiple cameras. When the correction factors are applied to update the positions of each of the display cameras 104, each display pixel of the combined image can be updated accordingly to produce a corrected composite digital image with improved image quality. Correcting the composite digital image can occur in real time while the 3D video communication system 100 is in use.

The method 600 further includes, at 612, outputting the corrected combined image to the display 102, according to a possible implementation of the present disclosure. Outputting the corrected combined image to the display 102 occurs when the display 102 is engaged in displaying a 3D live video stream.

The method 600 can be employed in systems other than the 3D video communication system 100, e.g., in the context of other systems that feature multiple cameras in a precise arrangement. Such systems can include, for example, smart phones that include multiple cameras, autonomous vehicles that employ cameras together with LIDAR, GPS-based mapping programs that rely on immersive street-view images, mobile robot vision systems, camera arrays used for precision motion capture, and interactive touch displays that incorporate cameras.

Figure 10:
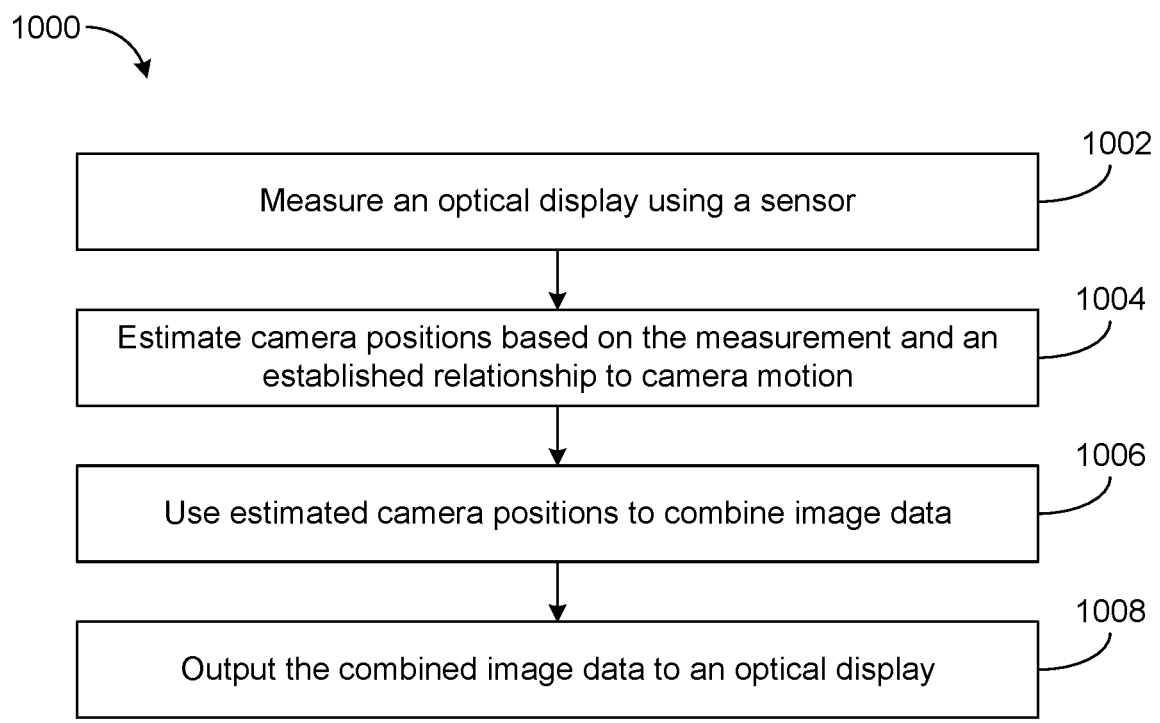
FIG. 10 is a flow chart for a virtual compensation process according to a possible implementation of the present disclosure.

FIG. 10 illustrates a method 1000 for a compensation process, according to a possible implementation of the present disclosure. Operations of the method 1000 can be performed in a different order, or not performed, depending on specific applications. The method 1000 may be performed using the low-cost sensors 214 shown in FIGS. 2B and 4A. The method 1000 includes real-time operations that occur during a live video session. The method 1000 can be used after an established relationship already exists between sensor data and camera motion. It is noted that the method 1000 may not completely compensate for thermal distortions affecting a display 102. Accordingly, it is understood that additional processes can be provided before, during, or after the method 1000, and that some of these additional processes may be briefly described herein.

The method 1000 includes, at 1002, measuring an optical display using a sensor, according to a possible implementation of the present disclosure. In some implementations, measuring the optical display can include recording temperature values from sensors 214 implemented as temperature sensors, e.g., thermocouples. In some implementations, measuring the optical display can include recording light intensity values from sensors 214 implemented as optical sensors. In some implementations, measuring the optical display can include recording distortion values from sensors

214 implemented as structural distortion sensors, e.g., strain gauges. When the sensors 214 are placed judiciously at locations of high sensitivity on the backplate 212, the sensor measurements can be used to predict camera positions with a high degree of accuracy. The thermal map of FIG. 4A, the deformation map of FIG. 4B, and the strain map of FIG. 5 can be used as guides for placing the sensors 214.

The method 1000 includes, at 1004, estimating camera positions, according to a possible implementation of the present disclosure. While the 3D video communication system 100 is in use, sensor data from operation 1002 can be recorded and input to the model 812. The output of the model 812, that is, the camera motion predictions 816, can then be used to estimate camera positions and update the relative position and/or orientation of each display camera 104 as they respond in real time to expansion and contraction of the display 102. Thus, the software can be continuously updated with the predicted locations of the display cameras 104.

The method 1000 further includes, at 1006, using the estimated camera positions to combine image data, according to a possible implementation of the present disclosure. The digital image to be displayed on the display 102 is a composite, that is, a combined image that includes image data from multiple cameras. When the estimated camera positions are applied to update the positions of each of the display cameras 104, each display pixel of the combined image can be updated accordingly to produce a corrected composite digital image with improved image quality. Correcting the composite digital image can occur in real time while the 3D video communication system 100 is in use.

The method 1000 further includes, at 1008, outputting the combined image data to the display 102, according to a possible implementation of the present disclosure.

Figure 11:
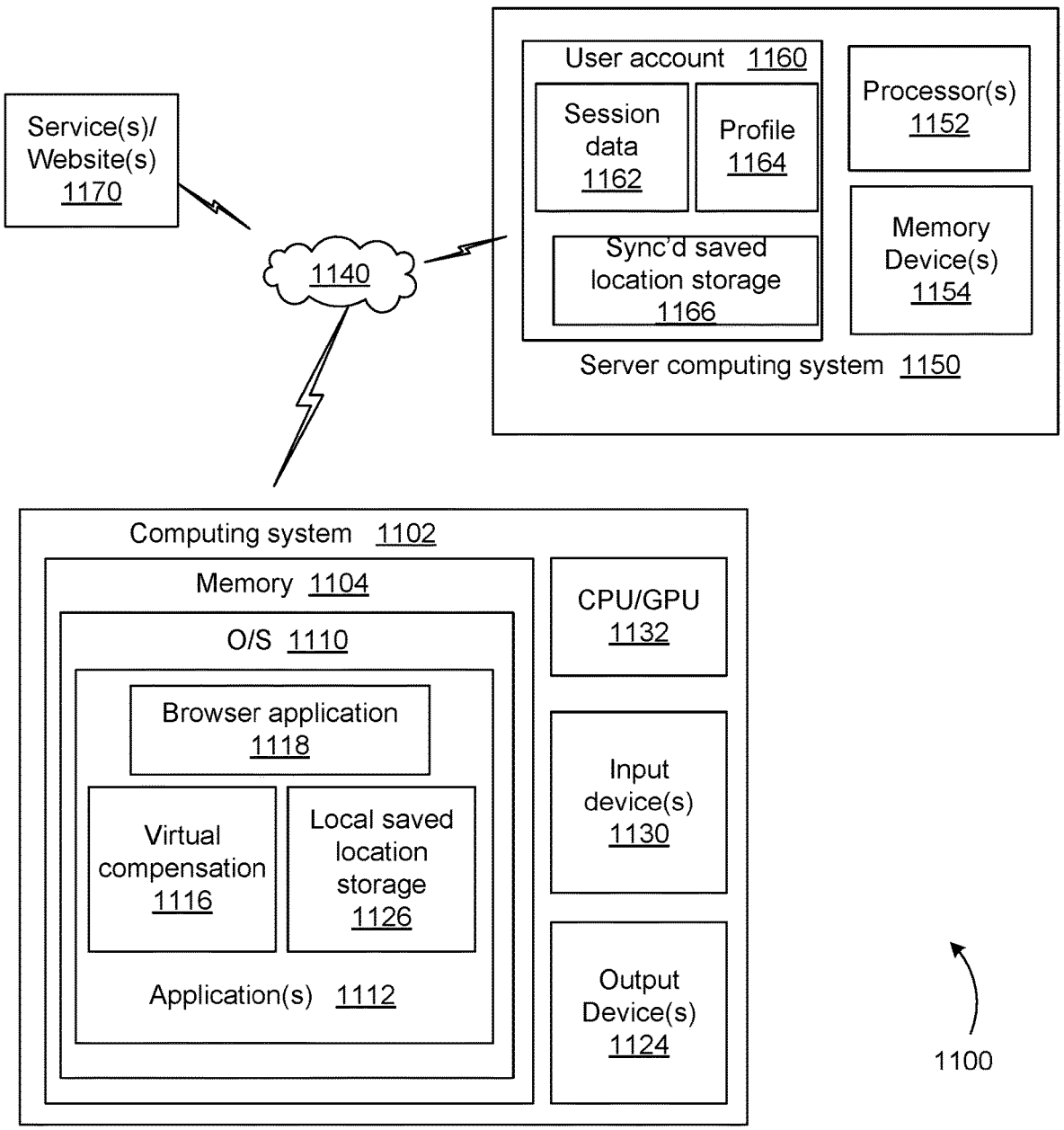
FIG. 11 is a block diagram of a computer system to support virtual compensation in a 3D video communication system, according to a possible implementation of the present disclosure.

Whether the method 600 or the method 1000 involves a function, a look-up table, or use of the neural network 810 to establish a relationship between the sensor measurements and camera motion, the methods 600 and 1000 will be implemented by a computer system running customized software. FIG. 11 illustrates a system 1100 that provides computing resources to support the virtual compensation methods described herein, represented by software in the form of a virtual compensation application 1116. In some implementations, the virtual compensation application 1116 may reference the neural network 810 as a data construct.

The system 1100 can be a stand-alone system or a networked, e.g., web-based, system. The system 1100 includes a computing system 1102. The computing system 1102 may also be referred to as a client computing device or a client device. The computing system 1102 is a device having an operating system 1110. In some examples, the computing system 1102 includes a personal computer, a mobile phone, a tablet, a netbook, a laptop, a smart appliance (e.g., a smart television), or a wearable computer. The computing system 1102 can be any computing device with input devices(s) 1110, such as a mouse, trackpad, touchscreen, keyboard, virtual keyboard, camera, etc. The computing system 1102 can include output device(s) 1124, such as a display (monitor, touchscreen, etc.) that enables a user to view and select displayed content. The computing system 1102 may include one or more processors, such as CPU/GPU 1112, formed in a substrate configured to execute one or more machine executable instructions or pieces of software, firmware, or a combination thereof. The processors, such as CPU/GPU 1112, can be semiconductor-based—that is, the processors can include semiconductor material that can perform digital logic. The computing system 1102 may include one or more memory devices 1104. The memory devices 1104 may include a main memory that stores information in a format that can be read and/or executed by the CPU/GPU 1112. The memory devices 1104 may store applications or modules (e.g., operating system 1110, applications 1112, browser application 1118, etc.) that, when executed by the CPU/GPU 1112, perform certain operations. The memory devices 1104 may include a database used to store sensor data, camera position data, and the model 812, to support the virtual compensation methods described herein.

The operating system 1110 is a system software that manages computer hardware, software resources, and provides common services for computing programs. In some examples, the operating system 1110 is operable to run on a personal computer such as a laptop, netbook, or a desktop computer. In some examples, the operating system 1110 is operable to run a mobile computer such as a smartphone or tablet. The operating system 1110 may include a plurality of modules configured to provide the common services and manage the resources of the computing system 1102. The computing system 1102 may include one or more input devices 1130 that enable a user to select content. Non-exclusive example input devices 1130 include a keyboard, a mouse, a touch-sensitive display, a trackpad, a trackball, and the like. The computing system 1102 may include one or more output devices 1124 that enable a user to view a webpage and/or receive audio or other visual output.

The computing system 1102 may include applications 1112, which represent specially programmed software configured to perform different functions. One of the applications may be the browser application 1118. The browser application 1118 may be configured to display webpages, execute web applications, and the like. The browser application 1118 may include additional functionality in the form of extensions. In some implementations, the browser application 1118 may also be the operating system 1110 of the computing system 1102, e.g., similar to the CHROME OS. The browser application 1118 may include local saved location storage 1126. The local saved location storage 1126 may be a data store where saved locations (bookmarks, favorites, internet shortcuts, etc.) are stored. In some implementations, a user may opt to synchronize saved locations with a user profile. In such implementations, the use may have a user account 1160 on a server computing system 1150 and periodically the local saved location storage 1126 may be sent to the server computing system 1150 so that the synchronized saved location storage 1166 can be updated with the user's local saved location storage 1126. The user has control over the synchronization process.

Put another way, a user may be provided with controls allowing the user to make an election as to both if and when the saved locations, including the future use intents and any attributes/metadata associated with a future use intent, are saved in the local saved location storage 1166, and if, when, and how much of the information stored in the local saved location storage 1166 is synchronized with the user's profile, e.g., shared with the server computing system 1150. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In some examples, the computing system 1102 may communicate with a server computing system 1150 over a network 1140. The server computing system 1150 may be a computing device or computing devices that take the form of a number of different devices, for example a standard server, a group of such servers, or a rack server system. In some examples, the server computing system 1150 may be a single system sharing components such as processors and memories. The network 1140 may include the Internet and/or other types of data networks, such as a local area network (LAN), a wide area network (WAN), a cellular network, satellite network, or other types of data networks. The network 1140 may also include any number of computing devices (e.g., computer, servers, routers, network switches, etc.) that are configured to receive and/or transmit data within network 1140. Network 1140 may further include any number of hardwired and/or wireless connections.

The server computing system 1150 may include one or more processors 1152 formed in a substrate, an operating system (not shown) and one or more memory devices 1154. The memory devices 1154 may represent any kind of (or multiple kinds of) memory (e.g., RAM, flash, cache, disk, tape, etc.). In some examples (not shown), the memory devices 1154 may include external storage, e.g., memory physically remote from but accessible by the server computing system 1150. The server computing system 1150 may include one or more modules or engines representing specially programmed software. For example, the server computing system 1150 may include systems for managing and accessing user account(s) 1160. The user accounts 1160 may include data that a user has requested to be synchronized across devices, such as computing system 1102. The synchronized data can include session data 1162. The session data 1162 can enable a user to resume browsing activity after switching devices. The user account 1160 may also include profile data 1164. The profile data 1164 may include, with user consent, information describing the user. The profile data 1164 may also include data that identifies a user (e.g., a username and password). The user account 1160 may also include synchronized saved location storage 1166. The saved location storage 1166 may be a data store of saved locations for the user across devices. For example, as part of a synchronization activity the local saved location storage 1126 may be sent from the computing system 1102 to the server computing system 1150 and saved in saved location storage 1166.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises." "comprising," "includes," and/or "including." when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled." "connected," or "responsive" to, or "on," another element, it can be directly coupled, connected, or responsive to, or on, the other element, or intervening elements may also be present. In contrast, when an element is referred to as being "directly coupled." "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above." "upper," and the like, may be used herein for case of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below", or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A method, comprising:
performing a first measurement of a disturbance in an optical display using a sensor attached to the optical display, wherein performing the first measurement of the disturbance to the optical display includes measuring a combination of a strain and a thermal disturbance, and the sensor includes a strain gauge and a thermocouple;
performing a second measurement of camera motion in response to the disturbance;
establishing a correlation between the first measurement and the second measurement;
measuring a real-time disturbance in the optical display;
estimating changes in relative camera positions due to the real-time disturbance using the correlation;
combining image data from multiple cameras using the estimated changes; and
outputting a corrected combined image to the optical display.

2. The method of claim 1, further comprising:
repeating performing the first measurement and the second measurement at different locations on the optical display to build a database of data elements relating camera motion to the disturbance in the optical display;
storing the data elements in the database; and
determining a correction factor for each data element in the database.

3. The method of claim 2, further comprising using a machine learning algorithm to automate determining the correction factor for each data element.

4. The method of claim 2, wherein storing the data elements in the database includes relating the data elements using a neural network.

5. The method of claim 1, wherein performing the first measurement of the disturbance to the optical display includes measuring a strain, and the sensor is a strain gauge.

6. The method of claim 1, wherein performing the first measurement of the disturbance to the optical display includes measuring a thermal disturbance, and the sensor is a thermocouple.

7. The method of claim 1, wherein performing the first measurement of the disturbance to the optical display includes measuring an optical disturbance, and the sensor is an optical sensor that detects light intensity.

8. The method of claim 1, wherein performing the second measurement of the camera motion includes determining the camera motion relative to neighboring cameras in an array of cameras attached to the optical display.

9. The method of claim 1, wherein combining the image data and outputting the corrected combined image occur in real time while the optical display is in use.

10. The method of claim 9, wherein outputting the corrected combined image occurs when the optical display is engaged in displaying a 3D live video stream on a light field display.

11. A method, comprising:
establishing a relationship between sensor measurements and camera motion in a three dimensional (3D) light field display, wherein establishing the relationship includes training a machine learning algorithm using a neural network of the sensor measurements and corresponding recorded camera positions; and
compensating camera positions during a 3D live video stream, based on real-time sensor measurements and the relationship.

12. The method of claim 11, wherein compensating the camera positions includes applying, to each camera in the 3D light field display, a correction factor based on at least one of the real-time sensor measurements.

* * * * *